United States Patent
Sándor et al.

(10) Patent No.: US 7,689,411 B2
(45) Date of Patent: *Mar. 30, 2010

(54) CONCEPT MATCHING

(75) Inventors: Ágnes Sándor, Meylan (FR); Aaron Kaplan, Grenoble (FR)

(73) Assignee: Xerox Corporation, Norwalk, CT (US)

( * ) Notice: Subject to any disclaimer, the term of this patent is extended or adjusted under 35 U.S.C. 154(b) by 490 days.

This patent is subject to a terminal disclaimer.

(21) Appl. No.: 11/173,136

(22) Filed: Jul. 1, 2005

(65) Prior Publication Data

US 2007/0005343 A1   Jan. 4, 2007

(51) Int. Cl.
G06F 17/27 (2006.01)
(52) U.S. Cl. .................. 704/9; 704/7; 704/4; 707/3
(58) Field of Classification Search .............. 704/4, 704/7, 3, 9, 1
See application file for complete search history.

(56) References Cited

U.S. PATENT DOCUMENTS

| | | | |
|---|---|---|---|
| 5,146,406 A | 9/1992 | Jensen | |
| 5,297,039 A * | 3/1994 | Kanaegami et al. | 707/5 |
| 5,369,577 A * | 11/1994 | Kadashevich et al. | 704/9 |
| 5,794,050 A * | 8/1998 | Dahlgren et al. | 717/144 |
| 5,841,895 A * | 11/1998 | Huffman | 382/155 |
| 5,878,385 A | 3/1999 | Bralich et al. | |
| 5,963,940 A * | 10/1999 | Liddy et al. | 707/5 |
| 5,966,686 A | 10/1999 | Heidorn et al. | |
| 6,038,560 A * | 3/2000 | Wical | 707/5 |
| 6,178,396 B1 * | 1/2001 | Ushioda | 704/1 |
| 6,246,977 B1 | 6/2001 | Messerly et al. | |
| 6,263,335 B1 | 7/2001 | Paik et al. | |
| 6,480,843 B2 * | 11/2002 | Li | 707/5 |
| 6,675,159 B1 * | 1/2004 | Lin et al. | 707/3 |
| 6,678,667 B1 | 1/2004 | Ammon | |
| 6,678,677 B2 | 1/2004 | Roux et al. | |
| 6,741,988 B1 | 5/2004 | Wakefield et al. | |
| 6,745,161 B1 * | 6/2004 | Arnold et al. | 704/7 |
| 6,757,676 B1 | 6/2004 | Sugaya et al. | |
| 6,847,966 B1 | 1/2005 | Sommer et al. | |
| 7,058,567 B2 * | 6/2006 | Ait-Mokhtar et al. | 704/9 |

(Continued)

OTHER PUBLICATIONS

"Transformation-Based Error-Driven Learning and Natural Language Processing: A Case Study in Part-of-Speech Tagging" Eric Brill. Dec. 5, 1995.*

(Continued)

*Primary Examiner*—Richemond Dorvil
*Assistant Examiner*—Greg A Borsetti
(74) *Attorney, Agent, or Firm*—Fay Sharpe LLP

(57) ABSTRACT

A method for developing a system for retrieving text related to a selected concept within a text corpus includes identifying a set of semantic classes which express the concept and identifying a set of keywords for each of the semantic classes to be used in text searching in a text corpus. Each set of keywords includes at least one keyword. A plurality of syntactic rules are established which are to be applied to retrieved text which includes keywords. Each of the syntactic rules identifies a first of the semantic classes and a second of the semantic classes. A rule is satisfied when a keyword from the first of the semantic classes is in a syntactic relationship with a keyword from the second of the semantic classes. The syntactic relationship can be any one of a plurality of syntactic relationships.

20 Claims, 2 Drawing Sheets

U.S. PATENT DOCUMENTS

| | | | |
|---|---|---|---|
| 2003/0074187 A1* | 4/2003 | Ait-Mokhtar et al. | 704/9 |
| 2004/0024583 A1* | 2/2004 | Freeman | 704/4 |
| 2004/0059718 A1* | 3/2004 | Zhou et al. | 707/3 |
| 2004/0078190 A1* | 4/2004 | Fass et al. | 704/7 |
| 2004/0122656 A1* | 6/2004 | Abir | 704/4 |
| 2004/0167886 A1 | 8/2004 | Wakefield et al. | |
| 2004/0181390 A1 | 9/2004 | Manson | |
| 2004/0199375 A1* | 10/2004 | Ehsani et al. | 704/4 |
| 2004/0243568 A1* | 12/2004 | Wang et al. | 707/3 |
| 2007/0174041 A1* | 7/2007 | Yeske | 704/3 |

OTHER PUBLICATIONS

Lisacek, F., Chichester, C., Kaplan, A., Sándor, Á. Discovering Paradigm Shift Patterns in Biomedical Abstracts: Application to Neurodegenerative Diseases. Proceedings of the First International Symposium on Semantic Mining in Biomedicine (SMBM) Apr. 10th - 13th, 2005. European Bioinformatics Institute, Hinxton, Cambridgeshire, UK. 41-50. 2005.*

Hobbs, Jerry R., et al., "FASTUS: A Cascaded Finite-State Transducer for Extracting Information from Natural-Language Text", in Finite State Devices for Natural Language Processing, pp. 383; 406, E. Roche and Y. Schabes, Eds., MIT Press, Cambridge, Massachusetts [1997].

Joyce, T, et al., "The Thesaurus Approach to Information Retrieval", American Documentation, 9:192-197 [1948].

Yangarber, Roman, "Scenario Customization for Information Extraction", Ph.D. Thesis, New York University [2000].

Harabagiu, et. al., "FALCON: Boosting Knowledge for Answer Engines", The Ninth Text Retrieval Conference (TREC-9) [2000].

Jing, Y., et al., "An Association Thesaurus for Information Retrieval", Proceedings of RIAO-94, 4$^{th}$ International Conference "Recherche d'Information Assistée par Ordinateur", pp. 1-15 [1994].

Qui, Yonggang, et al., "Applying a Similarity Thesaurus to a Large Collection for Information Retrieval", Technical Report, Department of Computer Science, Swiss Federal Institute of Technology, pp. 1-15 [1995].

Buckley, Chris, et. al., "Automatic query expansion using SMART: TREC 3", in D. Harman, et., Proceedings of the TREC 3 Conference [1995].

Deerwester, S., et al., "Indexing by Latent Semantic Analysis", Journal of the American Society for Information Science 41, pp. 391-407 [1990].

Salton, G., et al., "Vector Space Model for Automatic Indexing", Association for Computing Machinery, Inc., pp. 273-280 [1975].

Santor, et al., Concept Matching System, Patent Application filed Jul. 1, 2005.

U.S. Appl. No. 11/173,680, filed Jul. 1, 2005, Agnes Sandor, et al.

Allan, J., et al., "First Story Detection in TDT Is Hard", Conference on Information and Knowledge Management, Proceedings of the Ninth International Conference on Information and Knowledge Management, pp. 374-381 (2000).

Lisacek, F., Chichester, C., Kaplan, A., Sandor, A., "Discovering Paradigm Shift Patterns in biomedical Abstracts: Application to Neurodegenerative Diseases", Proceedings of the First International Symposium on Semantic Mining in Biomedicine (SMBM), Apr. 2005, European Bioinformatics Institute, Hinxton, UK.

Scheffer, T. and Leser, Ulf, "Data Mining and Text Mining for Bioinformatics: Proceedings of the European Workshop", Held in Conjunction with ECML/PKDD—2003 Dubrovnik, Croatia.

Teufel, Simone, "Meta-discourse markers and problem-structuring in scientific articles", in ACL Workshop on Discourse Structure and Discourse Markets, pp. 43-49 (1998).

Zhang, Y., et al., "Novelty and Redundancy Detection in Adaptive Filtering", Proc. ACM SIGIR, pp. 81-88 (2002).

* cited by examiner

CONCEPT MATCHING

CROSS REFERENCE TO RELATED PATENTS AND APPLICATIONS

Reference is made to copending application Ser. No. 11/173,680, filed Jul. 1, 2005, entitled CONCEPT MATCHING SYSTEM, by Agnes Sándor and Aaron Kaplan [hereinafter "Sándor and Kaplan"], the disclosure of which is totally incorporated herein by reference.

BACKGROUND

The present exemplary embodiment relates generally to document processing. It finds particular application in conjunction with a method for developing a protocol for identifying text which expresses a given concept and a system for concept matching, and will be described with particular reference thereto. However, it is to be appreciated that the present exemplary embodiment is also amenable to other like applications.

Database and Internet searching are widely used for retrieving documents that are relevant to the information needs of a user. Many document processing problems involve finding text passages which express a given concept. Examples include information retrieval (IR), information extraction (IE), and question answering (QA) problems. Some concepts are generally expressed by a small set of fixed words or expressions and thus are readily easy to detect. For example, they may be detected automatically, using a simple keyword search or a set of regular expressions. Other concepts are more difficult to detect because their expressions are more varied. The problem stems from the fact that language is both productive and ambiguous: the same concept can be expressed by infinitely numerous expressions and, at the same time, the words making up the expressions can have different meanings in other contexts. Keyword searching is thus generally not applicable for concepts conveyed by a wide range of linguistic expressions.

Existing document processing systems typically deal with the productive nature of language by allowing substitution of similar expressions or expression schemata, where similarity is defined such that if one expression is relevant to a user's query, then similar ones can be assumed to be relevant as well. These similarities are usually defined using three levels of linguistic information: morphological equivalences, syntactic equivalences, and lexical semantic equivalences. For morphological equivalences a morphological processing component can detect word forms that are inflected or derived from the same root, e.g.: X acquires Y; X acquired Y; and the acquisition of Y by X. For syntactic equivalences: by using syntactic rules, a system can detect similarity between pairs of expressions such as: X acquired Y; and Y was acquired by X. For lexical semantic equivalences, a system can be provided (by hand or using corpus statistics) with information about various semantic relationships, e.g. synonymy or hyponymy, among lexical units, and this information can be useful for detecting similarities such as: X acquired Y; and X bought Y.

By using generic linguistic resources of the above sorts, a system can allow users to specify a single search pattern that matches a range of different expressions. For example, using currently available linguistic resources, a user searching for descriptions of acquisitions could conceivably write a single pattern that matched all of the above descriptions of transactions. However, the range of expressions that convey a given concept may be even greater. For example, simple morphological, lexical, and syntactic substitutions would not be sufficient to match that same pattern with expressions such as:

Y will end up being owned by X

Y became the new owner of X

Some concepts tend to be expressed in relatively limited ways, and for such concepts, reasonable coverage and precision can be attained using the standard types of linguistic resources described above, if not with a single query pattern then with relatively few of them. The example of commercial transactions appears to be such a concept—in most corpora, the majority of commercial transactions can be matched with one of the patterns "X sell Y" or "Z buy Y" using the standard types of resources. For this reason, the problem of finding purchases of companies is often used as an example in the IE literature. But for other concepts, the number of patterns needed becomes unmanageable.

The challenge, then, is to provide a way of expressing patterns that generalize over the types of variation that cannot be accounted for using traditional morphological, syntactic, and lexical semantic resources. There has been a great deal of theoretical work on the sort of linguistic resources that would be necessary to do this in a general way—for example, the ideal semantic lexicon would contain, in a machine-processable form, the information that a purchase involves a change of ownership, and that an expression following "end up" is the resultant state of a change. A system endowed with such a lexicon could conceivably infer that "Y will end up being owned by X" is likely to indicate a purchase of X by Y. But in practice, the information that could be considered for inclusion in such a lexicon is boundless, and the process of encoding it is time-consuming and error-prone, so practical, general-purpose results do not appear to be forthcoming.

Many systems employ lexical resources, such as a "named entity recognizer," which is a module that identifies a few types of expressions such as dates, numbers and names (primarily of people, places, and organizations), typically using a combination of fixed word lists and patterns. This allows the user to write extraction patterns in which all entities of a particular type, e.g. company names, are considered "similar" for the purposes of pattern matching. While named entity recognition can be useful for particular tasks, its range of applicability is limited.

REFERENCES

Salton, G., "The SMART Information Retrieval System" (Prentice Hall, Englewood Cliffs, N.J. (1971)) discloses a searching system that uses vector-space representations.

Hobbs, Jerry R., et al., "FASTUS: A Cascaded Finite-State Transducer for Extracting Information from Natural-Language Text," in Finite State Devices for Natural Language Processing, pp. 383-406 (E. Roche and Y. Schabes, Eds., MIT Press, Cambridge, Mass. (1997)) discloses an IE system which uses regular expression patterns of keywords in a specified grammatical structure.

U.S. Pat. No. 6,246,977 to Messerly, et al., discloses an information retrieval system utilizing semantic representation of text and constrained expansion of query words.

U.S. Pat. No. 6,678,677 to Roux, et al., discloses a method for information retrieval using a semantic lattice.

U.S. Pat. No. 6,263,335 to Paik, et al., discloses a system which identifies a predetermined set of relationships involving named entities.

Joyce, T. et al., "The Thesaurus Approach to Information Retrieval," American Documentation, 9:192-197 (1958) describes experiments performed using standard thesauri as a source of synonyms to be added to a query.

Yangarber, Roman, "Scenario Customization for Information Extraction," Ph.D. Thesis, New York University, Courant Institute of Mathematical Sciences, Department of Computer Science (2000) discusses the WordNet lexical database which provides a hierarchically-structured vocabulary for use in writing patterns.

Harabagiu, et al., "FALCON: Boosting Knowledge for Answer Engines," The Ninth Text Retrieval Conference (TREC-9) (2000) uses WordNet as a source of lexical substitutions in a QA task.

Jing, Y. et al., "An Association Thesaurus for Information Retrieval." Proceedings of RIAO-94, 4th International Conference "Recherche d'Information Assistée par Ordinateur" (1994) and Qiu, Yonggang et al., "Applying a Similarity Thesaurus to a Large Collection for Information Retrieval," Technical Report, Department of Computer Science, Swiss Federal Institute of Technology (1995) discuss the use of automatically-constructed thesauri for information retrieval.

BRIEF DESCRIPTION

Aspects of the present disclosure in embodiments thereof include a method for developing a system for retrieving text related to a selected concept within a text corpus and a method for retrieving text. In one aspect, a method for developing the system includes identifying a set of semantic classes which express the concept and identifying a set of keywords for each of the semantic classes to be used in text searching in a text corpus. Each set of keywords includes at least one keyword. A plurality of syntactic rules are established which are to be applied to retrieved text which includes keywords. Each of the syntactic rules identifies a first of the semantic classes and a second of the semantic classes. A rule is satisfied when a keyword from the first of the semantic classes is in a syntactic relationship with a keyword from the second of the semantic classes. The syntactic relationship can be any one of a plurality of syntactic relationships.

In another aspect, a method for retrieving text related to a selected concept within a text corpus includes identifying a set of semantic classes which, in combinations thereof, express the concept and identifying a set of keywords for each of the semantic classes to be used in text searching in a text corpus. Each set of keywords includes at least one keyword. A plurality of syntactic rules to be applied to retrieved text includes keywords, each of the syntactic rules identifying a first of the semantic classes and a second of the semantic classes. A rule is satisfied when a keyword from the first of the semantic classes and a keyword from the second of the semantic classes are in any one of a plurality of syntactic relationships. The syntactic rules are applied to a text corpus to identify text within the text corpus which satisfies at least one of the syntactic rules.

The system for developing a text retrieval system includes a memory for storing a set of semantic classes which, in combinations thereof, express a concept, a memory for storing keywords for each of the semantic classes to be used in text searching in a text corpus and for storing syntactic rules to be applied to retrieved text which includes keywords, a component which suggests sample sentences to a user which include one or more of the stored keywords, a user input for enabling a user to select sentences from the suggested sentences, and a component which proposes syntactic rules which are met by the selected sentences.

DETAILED DESCRIPTION

Figure 1:
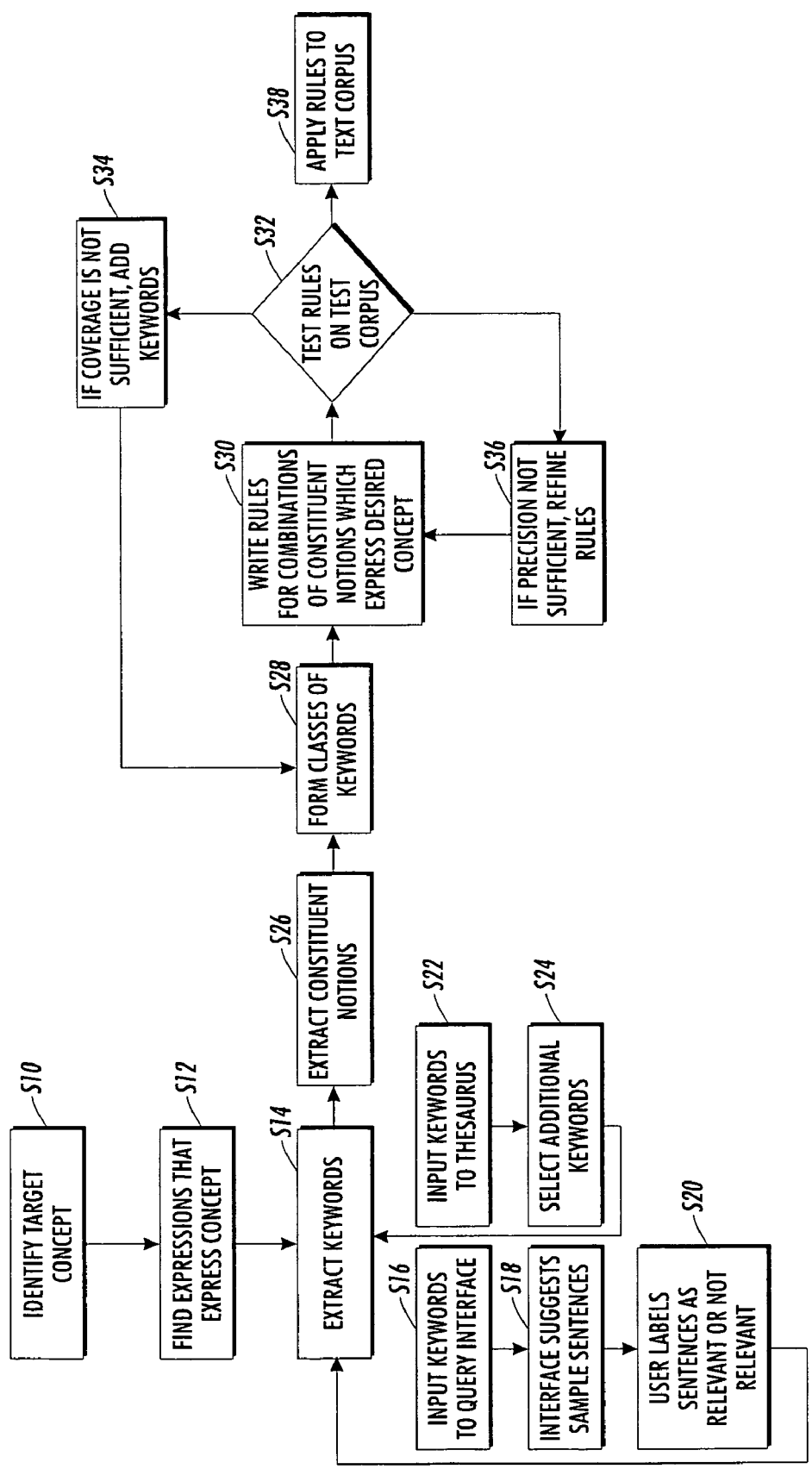
FIG. 1 is a flowchart for an exemplary process for developing keywords, constituent notions, and their co-occurrence syntax rules.

A methodology is described for developing systems that find concepts in natural language text. The method uses syntactic dependencies and task-specific semantic classes. The concept matching system developed using the methodology can be used to perform a search for the concept in a text corpus, such as a document database or internet information source. An exemplary concept matching system developed with such a methodology is described in Sándor and Kaplan, the disclosure of which is totally incorporated herein by reference. The method is particularly suited to developing a system which, with a reasonable assurance of accuracy, uncovers all or at least a preponderance of text/documents considered relevant to the particular search undertaken. In particular, the methodology develops a concept matching system which evaluates a set of documents which form all or a selected portion of a database. The term "document" as used herein may comprise a portion of a document, such as an article abstract, or an entire document. In the case of an abstract, for example, there are typically on the order of ten sentences per document. Each document includes at least one text portion, and generally a plurality of text portions. Each text portion is typically a sentence although it is contemplated that a text portion may be a portion of a sentence, such as a clause or portion in quotations.

In one embodiment, the system developed assigns a relevance to each document. The relevance may be based on criteria other than detection of the desired concept. The relevance may be a binary relevance determination (yes or no) or a weighted relevance determination, allowing the documents in the set to be ranked according to relevance. The concept matching system may be used in conjunction with keyword and/or other searching methods to limit the set of documents in the set to be searched to less than the entire database.

The methodology for developing a system for finding a selected concept in a text corpus can be generally described as including the following operations, which need not be performed in the following order:

1. Identifying the target concept.
2. Identifying a set of task specific semantic classes ("constituent notions") various cooccurrences of which express the target concept.
3. Identifying a list of keywords for each of the constituent notions to be used in text searching in a text corpus, such as a document database.
4. Establishing a set of patterns ("syntactic rules"), involving syntactically related keywords of the constituent notions identified in step 1, which are applied to text uncovered in the text searching.

Further operating steps may include:

5. Evaluating the methodology on a test text corpus, such as a subset of the documents in the database.
6. Repeating steps 1-4, as appropriate, to refine the constituent notions, keyword lists, and set of syntactic rules in order to improve the retrieval performance of the system.

The developed methodology can be applied to a test corpus. Each of these steps will be described in greater detail. As examples, two types of passages to be identified in press releases about new products are given. The first example concerns passages that describe the advantages of a new product over existing or previous solutions. As shorthand, the word "breakthrough" will be used to refer to this complex concept. Here are some sentences (taken from different press releases) that describe breakthroughs:

1. It delivers superb sensitivity and new insights into materials processes that cannot be obtained with conventional thermal analysis methods.
2. Video content in Macromedia Flash allows designers to maintain control of the look and feel of their applications, unlike today's existing video options which require external players to be launched and have platform inconsistencies.

A second example concerns passages, such as the following, that describe possible uses of new products:

3. Color-on-demand technology will first be introduced to surface-mount TOPLED and Power TOPLED packages, as they are suitable for unique lighting applications in corporate branding, architectural and entertainment lighting.
4. The new product, developed at SDK's Chichibu Plant, features a flip chip structure and is expected to fulfill a growing demand for use in outdoor displays, illumination, mobile phones, traffic light and automotive devices.

These examples demonstrate that there is no conventional, and thus recurrent, way of conveying the concepts of "breakthrough" and "possible use," which makes it difficult to define patterns for detecting them. Existing techniques appear to be inadequate for finding these sorts of concept. The present methodology responds to this challenge by providing a framework for describing a target concept and a computational mechanism for matching such descriptions with expressions in text.

Retrieval performance of the concept matching system can be defined in terms of recall and/or precision. Recall is the fraction of all relevant documents that are retrieved. Precision is the fraction of all retrieved documents that are relevant.

Decomposition of Target Concept into Constituent Notions

As noted above, writing general patterns that match a variety of expressions involves an understanding of what makes the expressions similar. The present framework allows a representation of the nature of the similarity among expressions of complex concepts. By way of example, the expressions describing the target concepts "breakthrough" and "possible use," discussed in the above examples are considered. These and other expressions describing these concepts have aspects in common, despite their varying vocabularies and grammatical structures.

Sentences with similar meanings, even if they use different words, tend to contain words that represent the same constituent notions. For example, the complex concept of "breakthrough" in the sentences above can be paraphrased as "the new product is different from those previously available." This analysis of the breakthrough concept yields the following constituent notions, listed with some example of keywords (here single words) that express them:

| CONSTITUENT NOTION | KEYWORDS |
|---|---|
| Time | new, existing, conventional, today, expect |
| Product | product, insights, methods, options, applications |
| Contrast | different, competes, cannot, unlike, inconsistencies, change |
| Availability | available, deliver, obtain |

Applying the same kind of analysis to the concept of possible use in the sentences above, this concept can be paraphrased by the expression "a product can be used by users," which introduces the following constituent notions:

| CONSTITUENT NOTION | KEYWORDS |
|---|---|
| Product | technology, product |
| Possibility | opened, new, expected |
| Use | applications, suitable, solutions, use, fulfill |
| User | demand, customers |

The words that instantiate a given constituent notion form a sort of semantic class. However, the present semantic classes differ from traditional ones in that their members need not share any of the usual morphological, syntactic or semantic properties. For example, in sentence 1, the constituent notion of "contrast" is represented by the verb "cannot," and in sentence 2, it is represented by the preposition "unlike." Similarly, the constituent notion of "use" is expressed in sentence 3 by the adjective "suitable," and in sentence 4, by the verb "fulfill." It is this heterogeneous nature of the semantic classes that gives the system a power to generalize that surpasses the possibilities of traditional linguistic resources.

Accordingly, the methodology includes developing a set of task-specific semantic classes which, in combination, express a target concept in a search to be performed. These classes will be referred to herein as constituent notions and may be identified by an identifier, such as a word or phrase. The word or phrase selected to identify the constituent notion (the "notion identifier") may be broader than or narrower than the constituent notion it identifies. It is also contemplated that constituent notions may be identified with alphanumeric characters or the like. While a fully developed concept matching system may have from two to any number of semantic classes, typically at least three, and in one embodiment, at least four semantic classes are employed. For most purposes, up to ten semantic classes are generally sufficient, typically between about four and eight semantic classes provide an effective search tool. During development of the system, fewer or more semantic classes may be selected for evaluation and these classes refined during development, for example by adding or removing one or more semantic classes with the object of improving retrieval.

For each constituent notion within the set of constituent notions that have been identified, a set of keywords which relate to the constituent notion is identified. While particular reference is made to keywords as being single words, the set of keywords may also include hyphenated words, compound words, roots of words (such as acquire or acquir* in place of acquiring, acquired, etc.), and the like. Although the set of keywords may include the notion identifier, as well as synonyms and homonyms of the notion identifier, it need not do.

The set of keywords generally includes words which are related to the constituent notion and, in particular, words which may be used in relevant expressions when the constituent notion is being conveyed. The words selected for a particular constituent notion are thus related to each other primarily in that they relate to the same constituent notion, not in that they have the same meaning, although some words may have the same or similar meanings as other words in the set. It is contemplated that a keyword associated with one constituent notion may also be associated with one or more, but generally fewer than all, of the other constituent notions in the set of constituent notions.

The process may be an iterative one, for example, starting with a limited set of keywords, identifying additional keywords and testing the effect the changes have on retrieval.

While the set of keywords for a given constituent notion may include as few as one keyword, it is contemplated that several of the constituent notions in the fully developed concept matching system (e.g., at least three, and in one embodiment, at least four constituent notions) will each be associated with at least five keywords. Typically, most or all of the constituent notions will be associated with a greater number of keywords, e.g., ten or more. The number of keywords in a set is not limited. However, keywords which are found not to improve information retrieval are generally dropped from the set of keywords during development of the concept matching system. During the development of the concept matching system, keywords can be added to or removed from the sets of keywords.

Various ways for developing the set of keywords are contemplated. These include, for example, analysis of a set of documents which have already been determined to satisfy the search criteria, keywords proposed by an interactive computer program, user evaluation of sentences proposed by a computer processing system in response to input keywords, and the like. The words selected for the constituent notions can be later verified by testing the methodology on a test set of documents and refined, as appropriate. For example, the set of keywords is refined by removing keywords which prove to be overly general and/or adding additional keywords which retrieve additional relevant documents, to increase the overall retrieval performance.

Development of Syntactic Rules to be Applied to Text Uncovered

As the example sentences above show, the co-occurrence of keywords (or text units) representing several constituent notions can indicate the presence of the target concept. However, it is generally not the case that any combination of constituent notions indicates the presence of the target concept. Consider, for example, the following sentences, for which the constituent notions are shown in brackets:

5. PITTCON remains one of the leading venues for introducing our market-driven solutions, and a forum for gathering customer input, which stimulates our teams to develop [availability] powerful new [time] products [product] that meet their needs.
6. A. D. Pharma has introduced [availability] an exciting new [time] product [product] unlike [contrast] anything previously [time] available [availability].

The co-occurrence of keywords denoting the constituent notions of time, and availability is not sufficient, in this case to convey the idea of breakthrough in sentence 5. However, a sentence like sentence 6 containing words denoting these three constituent notions as well as the constituent notion of contrast does convey the meaning of breakthrough. The following sentences demonstrate that even when several keywords of appropriate types co-occur in a sentence, the complex concept may not be present:

7. With the backing of government resources, we could do a better job of stimulating technology [scope] innovation that helps people and creates [availability] new [time] business opportunities, Gelsinger said, adding that while [contrast] health care is one of the largest segments of the U.S. gross domestic product, it has not fully capitalized on the benefits of technology [scope].
8. AirMagnet, the leader in wireless LAN (WLAN) security and performance solutions [use], today announced an entirely new [possibility] version of its Distributed WLAN security and performance system [product].

Sentences 7 and 8 are different from sentences such as 1-4 in that in sentences 1-4, the keywords are in direct syntactic relationships with each other, e.g., in sentence 1, the adjective "conventional" modifies the noun "methods," whereas in sentences 7 and 8, there is no direct syntactic link connecting any pair of keywords.

1. It delivers . . . new [time] insights [product] . . . that cannot [contrast] be obtained [availability] with conventional [time] . . . methods [product].
2. unlike [contrast] today's existing [time] video options [product]
3. . . . they are suitable for [use] . . . applications [use] in . . .
4. The new [possibility] product [product] . . . is expected [possibility] to fulfill [use] a growing demand [user] for use [use] in . . .

Adding a syntactic constraint to the rules for identifying constituent notions in the text can thus improve retrieval performance. In the exemplary embodiment, syntactic dependencies are required among the keywords. It is generally not necessary to specify the type of dependency (subject, object, etc.) that must be present; it is generally sufficient simply to require that there be some syntactic relationship. It has been observed empirically that this improves the precision of the method in two ways. It eliminates sentences where keywords are present but conceptually unrelated to each other, as in sentences 7 and 8, and it can also have the effect of resolving lexical ambiguity. For example, the word "LED" has a technical sense (Light Emitting Diode), and it is also the past participle of the "use" keyword "lead." Since, unlike the "use" sense, the technical sense tends not to be syntactically related to other "breakthrough" keywords (it tends, rather, to be linked to other technical terms), occurrences of the technical sense do not generally result in false hits.

Although requiring syntactic links results in a large gain in precision, in practice, it has been found that requiring all keywords to be syntactically linked tends to result in unacceptably low coverage. This is because the syntactic links are generally detected by an automatic parser, which can make mistakes, and because some pairs of words can be conceptually related without sharing a direct syntactic link. Therefore, in one embodiment, a relaxed syntactic criterion is employed: most keywords are considered to contribute to the expression of a complex concept if they are in a syntactic relationship with at least one other keyword. Exceptions can be made for words like adverbs and conjunctions that have particular syntactic properties which make it difficult to relate them syntactically to particular words in the sentence.

On the basis of the conceptual framework described above, a series of steps for implementing a search for a particular complex concept can be defined.

An exemplary methodology involves the development of a set of cooccurrence rules ("syntactic rules") by which text uncovered by searching for the selected keywords is to be further classified by relevance. The rules identify pairs of constituent notions which when present in text in syntactic relationship to one another, are found to improve or anticipated to improve retrieval performance. Once again, this may be an iterative process. For example, a rule is added to or deleted from the set of rules or an existing rule modified and the new set of rules tested on a test corpus, such as a subset of the documents in the database, to assess the retrieval performance of the modified rule set.

Syntactic relationships between words in a punctuated natural language text portion (typically a sentence or portion thereof, such as a clause or portion in quotations) can include, for example, the following relationships:

S1 between verb and its subject

S2 between verb and its object

S3 between adjective or adverb and the noun, verb or adjective it modifies

S4 between a noun and another noun that it premodifies

S5 between a noun and a noun or verb that it modifies by prepositional attachment For computer implementation of the system, an automated parser can be used to identify syntactic relationships in the documents which are selected by means of the search for keywords. The parser examines the text for syntactic relationships and flags the pairs of words involved in syntactic relationships. The output of the parser is a set of linked words and the syntactic relationship between the linked words. The number of syntactic relationships which may exist is virtually unlimited and in general, the parser searches for only a limited subset of the possible syntactic relationships. An exemplary parser of this type is described, for example in U.S. Patent Application No.2003/0074187, published Apr. 17, 2003, to Ait-Mokhtar, et al., which is incorporated herein in its entirety by reference. For any sentence there may be zero, one or more syntactic relationships identified.

The set of syntactic rules developed identifies pairs of semantic classes which are in any one of a plurality of syntactic relationships. In any rule, each of the two related words (such as a verb and its subject) represents by one of the constituent notions. For example for a set of constituent notions N1, N2, N3, . . . Nx and a set of selected syntactic relationships to be detected S1, S2, S3, S4, S5, . . . Sy, where x is the number of constituent notions in the set of constituent notions, and y is the number of syntactical relations which are accepted, some or all of the constituent notions are incorporated into at least one of the rules developed. For example, Rule R1={S1, S2, S3, S4, S5, . . . Sy} [N1+N2], i.e., words from constituent notions N1 and N2 are in any syntactic relationship S selected from S1, S2, S3, . . . Sy.

Rule R1 is satisfied for a given document or text portion thereof when any keyword belonging to constituent notion N1 and any keyword belonging to N2 are in syntactic relationship, for example S may be S2, an object/verb syntactic relationship. In this example, a keyword from N1 may be the verb and the keyword from N2, the object, or vice versa. In its broadest application, the syntactic relationship S between the two constituent notions can be any or all of the syntactic relationships to be detected by the parser. Generally, an automated parser is capable of identifying a fixed set of syntactic relationships at a sentence level. In accordance with aspects of the exemplary embodiment, the syntactic relationships which satisfy a given rule are all of those which the parser is capable to be used by the concept matching system is capable of identifying. In an alternative embodiment, a rule may define a specific subset of the syntactic relationships to be applied by the parser, such as one, two, three, four, six, or eight of the syntactic relationships identified by the parser. In one embodiment, all of the rules apply the same set of syntactic relationships.

The rules can be written in the same grammar formalism as used by the parser so that the rules are readily applied to the output of the parser. Alternatively, a different formalism is used for the rules.

The developed syntax rule may be associated with a weighting. The weighting roughly reflects the anticipated or observed relative importance of the rule in the overall retrieval performance. In its simplest form, all rules may be given the same weighting of 1. In more complex weighting schemes, the rules may each be assigned a weighting W of $0<W\leq1$. For example, some rules which are considered to strongly improve retrieval performance are assigned a weighting of 1 while others, considered to weakly affect retrieval performance, are assigned a weighting of 0.5. A weighted sum over all the rules of the product of number of occurrences that a rule is satisfied within a sentence or other text portion being evaluated (the occurrence rate T) and its weighting W can then be made.

In one embodiment, only documents with a weighted sum of at least 1 are retrieved. For the example above, this is satisfied by one rule with a weighting of 1 or two rules with a weighting of 0.5, which may be in the same sentence or different sentences. In another embodiment, only documents with at least one sentence having a weighted sum of at least 1 are retrieved.

A ranking of the documents can be made based on their scores (e.g., based on the number of times a syntactic rule is satisfied in a text passage). The ranking may also take into account the occurrences of certain specific keywords which are not in syntactic relationship but are nevertheless considered important. The ranking of documents may be performed by a ranking module of the concept matching system.

As an alternative to ranking, the system may list all documents which are considered to be relevant. The minimum relevance criteria may be for example, one pair of constituent notions in syntactic relationship or, where a weighting is applied, a minimum value of the sum of (occurrences x weighting) e.g., a minimum of 1. A minimum of 1 can be obtained, for example, where a "strong" pair of constituent notions (with a weighting of 1) is present or where two "weak" pairs of constituent notions (each with a weighting of 0.5) are present.

An exemplary methodology is illustrated in FIG. 1 and is outlined below. At each step, it is indicated what kind of automatic support the development environment (e.g., a computer system used for developing the concept matching system) may offer.

A target concept is identified (Step S10). Sample expressions that express the desired concept are found, for example, by manual review of sample text (Step S12), and from them, a first set of keywords is extracted (Step S14). This could be supported by a simple keyword query interface—given a keyword or combination of keywords that the user thinks might be useful (Step S16), the system may provide sample sentences in which that word occurs (Step S18). The user may label retrieved examples as relevant or not relevant (Step S20), for use as training data for step S30 below. In one embodiment, a computer processing unit is connected to a user input, such as a keyboard or touch screen. The user inputs a selected keyword (Step S16) and the processing unit proposes sample sentences (Step S18). Alternatively or additionally the user inputs words to a thesaurus (Step S22) and the processing unit may propose words (Step S24), for example on a display, such as a screen. The user may select, from the proposed words, those which are considered by the user to be most appropriate for the search. These words are then added to the set of keywords.

Iteratively, by examining the keywords collected so far, a number of constituent notions are manually identified that can be combined to express the target concept (Step S26), and classes of keywords are formed such that all of the words in a class express the same constituent notion (Step S28). Each keyword may express one or more constituent notions. This step depends on human intuition and is not readily automated; automatic support may be limited to an interface that facilitates the manual classification.

Rules are written indicating which combinations of constituent notions can be combined to express the desired concept, and how these combinations can be realized syntactically (Step S30). Examples labeled in step S20 can be parsed automatically to give suggestions for such rules that the user can validate or reject. For combinations of keywords that do not occur in the sample expressions, the system may automatically find examples in a corpus and present them to the user for annotation.

The rules developed in step S30 are applied to a test text corpus (Step S18) and the results evaluated. The application of the rules to a corpus can be entirely automated. An efficient way to implement this involves searching the text for sentences that contain the necessary keywords, parsing these sentences, and then filtering the parsed sentences according to the co-occurrences rules. The evaluation of the results is generally performed manually.

Refinement of the rules, classes, and/or keywords may be undertaken to improve retrieval. If coverage is not yet sufficient, additional keywords are identified (and/or keywords removed) and the method repeated from step S28. This may be done by hand by examining sentences retrieved in step S32; the system may also make suggestions automatically by identifying words that frequently occur in syntactic relations with known keywords. If precision is not sufficient, the co-occurrence rules may be refined and the method repeated from step S30. The system may prompt the user to mark sentences that were retrieved but should not be, indicating which rule was responsible for the selection of each such sentence, and allowing the user to edit that rule.

Figure 2:
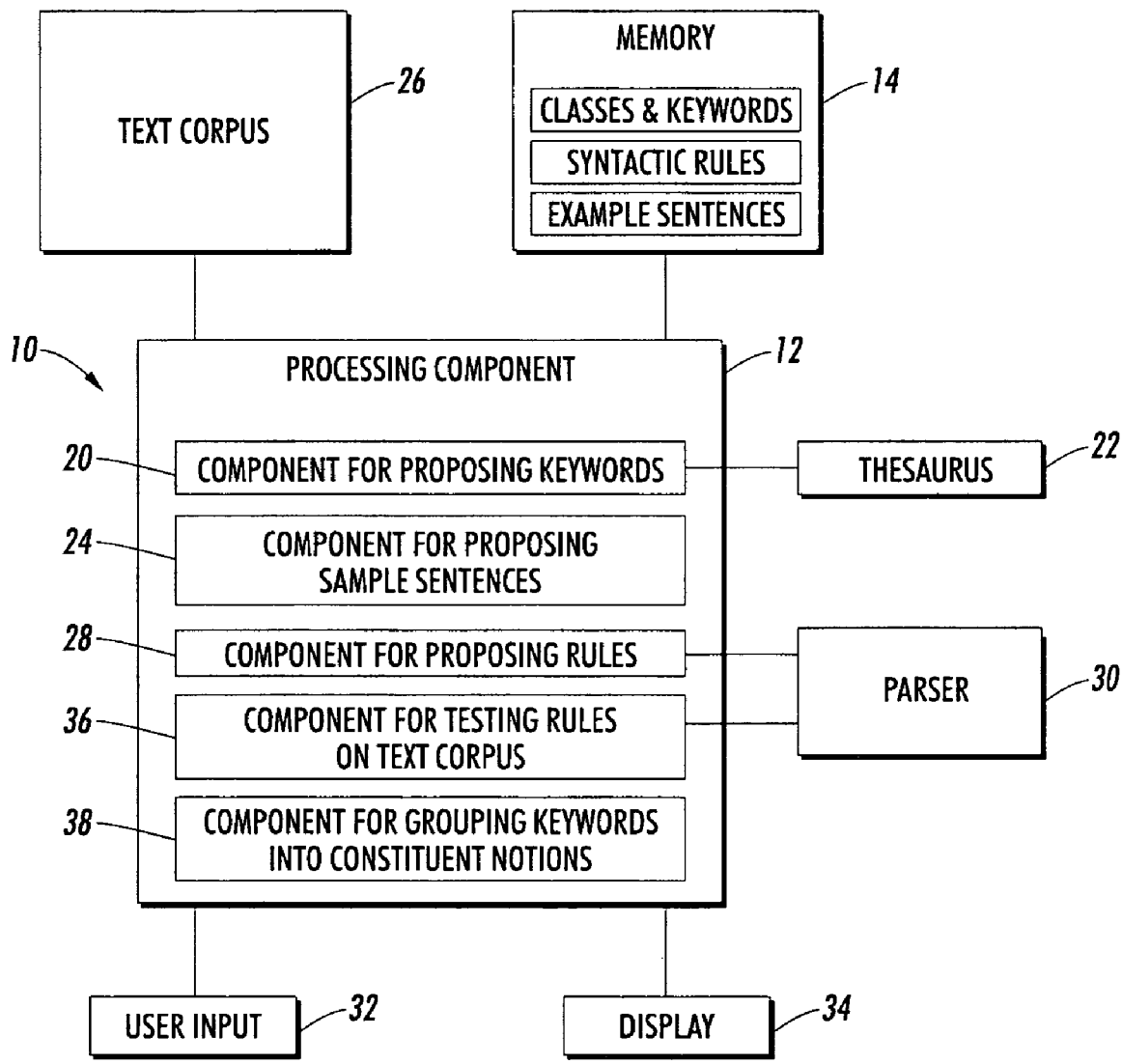
FIG. 2 is a schematic view of a system for developing a concept matching system.

As illustrated in FIG. 2, a system 10 for developing a text retrieval system may include a processing module 12 comprising software components for performing those steps which are performed automatically as well as memory 14 for storing semantic classes and keywords as they are selected, rules as they are developed, example sentences, and user-selected example sentences. For example, the processing module 12 may include a component 20 for proposing keywords through access to a thesaurus 22, a component 24 for proposing sample sentences selected from a text corpus 26, and a component 28 for proposing rules to a user. The rules may be identified by a parser 30 through examination of sample sentences selected by a user. A user input 32, such as a keyboard, touch screen, or the like accompanied by a display 34, such as a screen, allows a user to interact with the processing module 12, for example for user selections of keywords, sentences and rules. The processing module 12 also includes a component 36 for testing the rules on a test corpus. The processing module may also include a component 38 for grouping keywords into constituent notions which, through interaction with the user via the user input, associates the keywords in the memory with their respective notion or notions.

Once the concept matching system has been developed, as described above, it may be embodied as a "concept matching module" in any suitable electronic information retrieval system, such as a processing unit of a computer system, such as an individual computer or network, "either as hardware or stored as software on a storage medium" (e.g., CD or DVD). The database or other text corpus to be searched is accessible to the information retrieval system. The database may be provided on a hard disk of a computer system or on particular storage medium as CDs, DVDs, or other digital storage media. Alternatively, the concept matching module and or database may be stored at a remote location connected to the computer system via a data transmission network.

The methodology thus described is designed to develop a concept matching system which finds instances of a concept in text. The applications for which the method is useful do not necessarily fall into any of the classical categories of existing systems: information retrieval (IR) systems, information extraction (IE) systems, and question answering (QA) systems. Although there are similarities with some of these approaches, the differences can lead to increased information retrieval performance. "Copending application Ser. No. 11/173680", by Sándor and Kaplan, referred to above and incorporated by reference, provides an example system developed by the present methodology for selecting documents which has some of the objectives of an IR system. Since the present methodology addresses a new sort of search problem, its design differs from those of existing systems. In particular, the present methodology has advantages in the way in which syntax is used to restrict results, and the type of lexical resource that is used.

Most IR engines currently in mainstream use are based on the "bag of words" model, in which a document's content is approximated by the set of words it contains, sometimes augmented with the number of times each word occurs. The present method uses syntactic structure as an indication of conceptual relatedness, which results in increased precision compared to a purely keyword-based approach.

Some IE systems specify a number of keywords that must be present for a match to take place and specify an overall grammatical structure of the sentence. The exemplary methodology described herein employs a pattern which lists a set of constituent notions, and requires that some of these constituent notions be syntactically related, but does not specify the specific syntactic role that each constituent notion must play in the sentence. One of the important discoveries underlying this approach is that for the concept matching problem, at least for certain types of concepts, one can use this less-restrictive type of rule without a significant loss of precision. Since a single rule of this type can match a wider range of linguistic expressions, it makes it possible to achieve broad coverage of concepts that would require prohibitively many rules to cover with a FASTUS-type system.

While identifying particular syntactic relationships is important in a task such as IE or QA where one needs to find out "who did what to whom," it has been found that in some concept matching applications, this information is not necessary, and that abstracting it away allows more general patterns to be written, using semantic classes that group together words that express the same concept but are of different parts of speech.

Although not required, the methodology may employ thesauri and/or other lexical resources. The thesaurus may be a hand-built thesaurus of the type disclosed in Joyce, et al., or a thesaurus which is automatically generated using corpus statistics, such as that disclosed in Jing, et al, and Qui, et al.

In some cases, coverage by the present methodology may be improved by using information about similarities between words. One kind of lexical resource which addresses similarities is a "named entity recognizer," which is a module that identifies a few types of expressions such as dates, numbers and names (of people, places, organizations, and the like), typically using a combination of fixed word lists and patterns. Extraction patterns can be written in which all entities of a particular type, e.g., company names, are considered "similar" for the purposes of pattern matching. While named entity recognition can be useful for particular tasks, its range of applicability is limited. The present methodology allows the detection of concepts that do not involve named entities, and for concepts that do, a named entity recognition module could be integrated into the architecture.

The method has application for a variety of disciplines, particularly scientific disciplines. For example, the method can be used to develop a system for retrieving documents from a database, which includes millions of documents. A system developed using documents from one database, including keywords, constituent notions and rules can be used to find documents from another database related to the same complex concept.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method for developing a system for retrieving text related to a selected concept within a text corpus, the method comprising:
   identifying a set of at least three semantic classes which in combinations thereof express the concept, each of the semantic classes expressing a constituent notion of the concept;
   identifying a set of keywords for each of the semantic classes to be used in text searching in a text corpus, each set of keywords including at least one user-selected keyword, at least some of the semantic classes including keywords which are used in relevant expressions in retrieved text when the constituent notion is being conveyed and including keywords having different meanings from other keywords of the same semantic class and which are not synonymous with the other keywords;
   establishing, with a processing unit of a computer system, a plurality of syntactic rules to be applied to retrieved text which includes keywords, each of the syntactic rules identifying a first of the set of semantic classes and a second of the set of semantic classes, the rule being satisfied when any keyword from the first of the semantic classes is in a syntactic relationship with any keyword from the second of the semantic classes, the syntactic relationship comprising any one of a plurality of syntactic relationships.

2. The method of claim 1, wherein the method develops a system which identifies text within the text corpus which satisfies at least one of the syntactic rules.

3. The method of claim 1, further comprising: evaluating the system on a test subset of the text in the text corpus.

4. The method of claim 1, wherein the identifying of the set of semantic classes and the identifying of the set of keywords comprises:
   finding sample expressions in text that express the desired concept, and extracting keywords from the sample expressions.

5. The method of claim 1, wherein the identifying of the set of semantic classes and the identifying of the set of keywords comprises:
   supplying a keyword or a combination of keywords anticipated to retrieve text expressing the concept to a system which retrieves example text which include the keyword or combination of keywords; and
   labeling retrieved examples as relevant or not relevant.

6. The method of claim 1, wherein the identifying of the set of semantic classes and the identifying of the set of keywords comprises:
   examining a set of keywords which express a concept and identifying constituent notions that can be combined to express the target concept; and
   forming semantic classes of keywords such that all of the keywords in a class express the same constituent notion.

7. The method of claim 1 wherein at least one of the semantic classes includes a keyword of another of the semantic classes.

8. The method of claim 1, wherein the establishing of the plurality of syntactic rules comprises:
   identifying combinations of semantic classes which can be combined to express the desired concept when syntactically related.

9. The method of claim 1, further comprising:
   applying a proposed system to a portion of the text corpus; and
   manually evaluating the retrieval performance of the system based on the documents retrieved.

10. The method of claim 9, further comprising:
    if recall is less than a predetermined minimum recall, modifying at least one of the semantic classes by adding keywords;
    if precision is less than a predetermined minimum precision, refining the syntactical rules.

11. The method of claim 1, wherein the syntactic relationships include at least two of the following pairs, where the first of the semantic classes includes a keyword in one of the pair and the second of the semantic classes includes a keyword in the other of the pair:
    a verb and its subject;
    a verb and its object;
    one of an adjective and an adverb and one of a noun, verb and adjective that the adjective or adverb modifies;
    a noun and another noun that the noun premodifies; and
    a noun and one of a noun and verb that the noun modifies by prepositional attachment.

12. The method of claim 1, wherein there are at least four syntactic relationships.

13. The method of claim 1, wherein each of the syntactic rules applies the same set of syntactic relationships.

14. The method of claim 1, wherein at least two of the semantic classes each include at least five keywords.

15. The method of claim 1, wherein there are at least four semantic classes.

16. The method of claim 15, wherein at least four of the semantic classes each include at least five keywords.

17. The method of claim 1, wherein there are up to ten semantic classes.

18. A method for developing a system for retrieving text related to a selected concept within a text corpus, the method comprising:
    identifying a set of at least four semantic classes which in combinations thereof express the concept;
    identifying a set of keywords for each of the semantic classes, where the keywords are to be used by the system in text searching in a text corpus, each set of keywords including at least one keyword, at least some of the semantic classes including keywords which are used in relevant expressions in retrieved text when the constituent notion is being conveyed and including keywords having different meanings from other keywords of the same semantic class and which are not synonymous with the other keywords;

establishing, with a processing unit of a computer system, a plurality of syntactic rules which are to be applied by the system to retrieved text which includes keywords from the sets of keywords, each of the syntactic rules identifying a first of the semantic classes and a second of the semantic classes, the rule being satisfied when any keyword from the first of the semantic classes is in a syntactic relationship with any keyword from the second of the semantic classes, the syntactic relationship comprising any one of a plurality of syntactic relationships, the establishing of the plurality of syntactic rules comprising:

automatically parsing selected examples of text to identify syntactic relationships between a keyword of a first of the semantic classes and a keyword of a second of the semantic classes; and presenting the identified relationships to a user for manually selecting syntactic rules which select those syntactic relationships which express the desired concept.

19. A method for retrieving text related to a selected concept within a text corpus comprising:

identifying a set of semantic classes which, in combinations thereof, express the concept, each of the semantic classes expressing a constituent notion of the concept;

identifying a set of keywords for each of the semantic classes to be used in text searching in a text corpus, each set of keywords including a plurality of keywords, at least some of the semantic classes including keywords which are used in relevant expressions in retrieved text when the constituent notion is being conveyed and including keywords having different meanings from other keywords of the same semantic class and which are not synonymous with the other keywords;

establishing, with a processing unit of a computer system, a plurality of syntactic rules to be applied to retrieved text which includes keywords, each of the syntactic rules identifying a first of the semantic classes and a second of the semantic classes, the rule being satisfied when any one of the keywords from the first of the semantic classes and any one of the keywords from the second of the semantic classes are in any one of a plurality of syntactic relationships; and applying the syntactic rules to a text corpus to identify text within the text corpus which satisfies at least one of the syntactic rules.

20. A computer system for developing a text retrieval system comprising:

a memory for storing a set of semantic classes which, in combinations thereof, express a concept, each of the semantic classes expressing a constituent notion of the concept;

memory for storing keywords for each of the semantic classes to be used in text searching in a text corpus and for storing syntactic rules to be applied to retrieved text which includes keywords, at least some of the semantic classes including keywords which are used in relevant expressions in retrieved text when the constituent notion is being conveyed and including keywords having different meanings from other keywords of the same semantic class and which are not synonymous with the other keywords;

a component which suggests sample sentences to a user which include one or more of the stored keywords;

a user input device for enabling a user to select sentences from the suggested sentences; and a component which proposes syntactic rules which are met by the selected sentences, each of the syntactic rules identifying a first of the set of semantic classes and a second of the set of semantic classes, the rule being satisfied when any keyword from the first of the semantic classes is in a syntactic relationship with any keyword from the second of the semantic classes, the syntactic relationship comprising any one of a plurality of syntactic relationships, whereby when the syntactic rules are applied to a text corpus, text within the text corpus which satisfies at least one of the syntactic rules is retrieved, the component presenting the proposed syntactic rules to the user on a display.

* * * * *